United States Patent [19]

Yetter

[11] Patent Number: 5,045,859
[45] Date of Patent: Sep. 3, 1991

[54] PHASE REFERENCE NAVIGATION SYSTEM AND METHOD

[75] Inventor: Forrest G. Yetter, Alexandria, Va.

[73] Assignee: Aviation Systems Concepts, Inc., Annandale, Va.

[21] Appl. No.: 244,289

[22] Filed: Sep. 15, 1988

[51] Int. Cl.$^5$ .......................... G01S 1/14; G01S 5/04
[52] U.S. Cl. ................................... 342/414; 342/432
[58] Field of Search ............... 342/398, 399, 401, 403, 342/404, 406, 410–412, 414, 432; 364/451

[56] References Cited

U.S. PATENT DOCUMENTS

| | | |
|---|---|---|
| 2,300,581 | 11/1942 | Luck . |
| 2,328,476 | 8/1943 | Luck . |
| 2,523,900 | 9/1950 | DeFremery et al. ............... 342/410 |
| 2,653,314 | 9/1953 | Litchford . |
| 2,711,533 | 6/1955 | Litchford . |
| 2,713,163 | 7/1955 | Himmel . |
| 2,715,727 | 8/1955 | Pickles . |
| 3,080,559 | 3/1963 | Thor et al. .......................... 342/432 |
| 3,111,671 | 11/1963 | Thompson . |
| 3,328,798 | 6/1967 | Warfield et al. . |
| 3,525,979 | 8/1970 | Kunkel et al. . |
| 3,534,366 | 10/1970 | Guldenpfennig . |
| 3,754,259 | 8/1973 | Redlich . |
| 3,787,859 | 1/1974 | Howard .............................. 342/401 |
| 3,946,387 | 3/1976 | Drucker ............................. 342/414 |
| 4,197,542 | 4/1980 | Hofgen . |
| 4,567,486 | 1/1986 | Breiholz . |
| 4,591,861 | 5/1986 | Kautz . |
| 4,698,636 | 10/1987 | Marlow et al. . |
| 4,723,123 | 2/1988 | Marlow et al. . |
| 4,806,932 | 2/1989 | Bechtel . |

FOREIGN PATENT DOCUMENTS

2087186  5/1982  United Kingdom ................ 342/403

Primary Examiner—Gregory C. Issing
Attorney, Agent, or Firm—Kerkam, Stowell, Kondracki & Clarke

[57] ABSTRACT

A phase reference navigation system and method employs a plurality of fixed narrow beamwidth antennas arranged to cover a predetermined angular sector and such that the patterns of adjacent antennas crossover one another at their half-power points. Each antenna radiates an RF carrier which is amplitude modulated by a reference phase signal and by one of two different frequency subcarriers. Adjacent antennas radiate different frequency subcarriers. Each subcarrier is frequency modulated by a variable phase signal which has a phase relative to the reference signal which corresponds to the direction of orientation of the antenna from which that subcarrier radiates. A receiver simultaneously receives the RF energy radiated by two adjacent antennas. Upon demodulation, the two variable phase signals are recovered and combined to produce a resultant signal which has a phase that varies as a function of angle between the two antennas. The invention utilizes FM capture effect principles to substantially reduce multipath effects and is useful for omni-directional, or bi-directional or uni-directional systems.

17 Claims, 5 Drawing Sheets

PHASE REFERENCE NAVIGATION SYSTEM AND METHOD

BACKGROUND OF THE INVENTION

The present invention relates generally to radio navigation systems and methods for use with aircraft and the like, and more particularly to a microwave phase reference system and method which may be used for omni-directional, bi-directional or uni-directional navigation.

The very high frequency omni-directional range (VOR) navigation system is a well known phase reference omni-directional navigation system which is used extensively throughout the world to provide aircraft with flight path bearing information. In this system, two signals are radiated by a VOR ground station, and the station produces a spatially rotating electromagnetic field. One of the signals comprises a reference phase signal which is radiated omni-directionally, and the other signal comprises a variable phase signal which has a phase that varies linearly with azimuth angle relative to the reference signal. The reference phase signal is transmitted as a 30 Hz frequency modulated 9960 Hz subcarrier on a radio frequency (RF) carrier in the VHF frequency range of 112-118 MHz. The variable phase signal comprises a 30 Hz amplitude modulation which is impressed upon the RF carrier by utilizing an antenna system which produces a non-symmetrical field, such as a cardioid or a lamicon pattern, and feeding the antenna system so as to cause the field to rotate at eighteen hundred RPM or, expressed otherwise, at 30 Hz. A cooperating aircraft receiver provides bearing information relative to the VOR station by measuring the phase difference between the reference and the variable phase signals.

Conventional VOR (CVOR) systems are susceptible to a number of errors. The most common error is multipath error caused by reflections from surface irregularities or obstacles above or below the ground plane of the VOR site. Such surface reflections may be due, for example, to varying topography or to the presence of buildings, fences, trees, etc . . . Multipath errors result from the vector addition of the direct and reflected field components of the received signal. The amount of error is dependent upon the relative magnitude of the direct and reflected signals, the phase difference between the signals, and the difference in azimuth between the receiver and reflector. For example, the course error, $\alpha$, may be calculated by use of the formula $$\alpha = \tan^{-1}\left[\frac{K \sin \phi}{1 + K \cos \phi}\right]$$

where K is the amplitude ratio of direct to reflected signals and $\phi$ is the phase difference in azimuth between the direct and reflected signals. Accordingly, if K=0.3 and $\phi$=30°, course error $\alpha$=7.5 degrees.

Multipath errors may be minimized to some extend by use of a Doppler VOR (DVOR) system in which the reference phase signal is radiated by an omni-directional antenna as a 30 Hz amplitude modulated RF carrier signal, and the azimuth dependent variable phase signal is generated in space as a 9960 Hz carrier sideband which is frequency modulated at 30 Hz by the doppler effect of sequentially switched antennas disposed in a ring about the omni-directional reference phase signal antenna. Typically, a DVOR array comprises fifth antennas disposed around a horizontal aperture having a diameter of about five wavelengths (13.5 meters). The physical size of a CVOR or DVOR antenna array, associated counterpoise and required large ground plane area precludes operation from sites having limited space such as offshore oil drilling platforms, heliports and water vessels. Control of VOR radial alignment is primarily limited to adjustment of one course to coincide with a selected azimuth (Magnetic North) bearing. Course errors inherent to VOR systems include octantal error, quadrantal error, duantal error in addition to other errors caused by counterpoise effect. Mountain top VOR stations often encounter a limited ground plane (less than 20 wavelengths) thereby radiating negative angle signals which can produce multipath signal conditions. In addition, since known phase reference navigational systems employ spatially rotating fields, i.e., antenna patterns, it is necessary for the receiver to receive signals radiated by all elements of the antenna array. Thus, uni-directional or bi-directional operation is not possible.

It is desirable to provide a new and improved navigation system which avoids the foregoing and other disadvantages of known systems, and it is to this end that the present invention is directed.

SUMMARY OF THE INVENTION

The present invention provides a highly advantageous navigational system and method which may be operated and used in a number of different ways. The system may be operated, for example, as an omni-directional, a bi-directional, or a uni-directional or sector navigational system. It may serve as an omni-range beacon, as a localizer, and even to provide elevation bearing or glide angle information. The system is substantially free of errors due to multipath reflection and provides continuous and accurate bearing information, which when used with distance measuring equipment makes it useful for radial offset area navigation.

An advantage of the invention is that it employs spatially static (non-rotating) radiation fields, which eliminates the need for complicated antenna array feed systems such as goniometers or RF distributors which characterize conventional and doppler VOR navigation systems. Instead, the invention employs a plurality of discrete narrow beamwidth antenna patterns which are oriented in different predetermined directions with a predetermined angular spacing and overlap between adjacent beams. Each antenna radiates a reference phase signal and a variable phase signal. The reference phase signal has a phase which is the same at all antennas and is independent of angular direction, whereas the variable phase signal has a phase relative to the phase of the reference phase signal which corresponds to the angular orientation of the antenna, i.e., the angular direction in which the antenna beam is pointed. Preferably, the incremental differences in the RF phase between adjacent antenna elements are equal and the sum of the phase differences corresponds to the degrees of azimuth covered. For an omni-directional system, 360° of azimuth angle corresponds to a $2\pi$ radian phase difference, i.e., each degree of phase shift corresponds to a 1° difference in bearing angle. Moreover, the phase relationship is preferably selected such that the phase difference between the variable phase signal and the reference phase signal is zero in a predetermined direction, e.g., Magnetic North, so that the absolute magnitude of the phase difference corresponds to the bearing angle of the antenna.

Another feature of the invention is that the variable phase information radiated by adjacent antennas may be conveyed on different frequencies and, preferably, by frequency modulating different frequency subcarriers with the variable phase information. This arrangement provides high immunity to multipath errors due to capture effect characteristics inherent with FM demodulation. In addition, this affords continuous bearing information since the amplitudes of the two subcarrier frequencies received from adjacent antennas will vary continuously and inversely with respect to one another with angular position between the two antennas. Continuous angular information between adjacent antennas can be derived from the magnitudes of the two subcarrier frequencies.

Briefly stated, the invention provides a phase reference-type navigation system and method in which a plurality of spatially fixed beams of RF energy are radiated in different predetermined angular directions. Variable signals are impressed upon each beam, and the phase of the variable signals is adjusted to correspond to the predetermined angular direction of the beam upon which each signal is impressed. In a receiver, the variable signals from first and second ones of the beams are combined to form a resultant signal which has a phase that varies as a function of angle between the phases of the first and second beams.

In another aspect, the invention provides a navigation system which comprises a plurality of antenna elements, each having a radiation pattern with a predetermined beamwidth and the elements being arranged to have different predetermined directions of orientation with the radiation patterns of adjacent elements overlapping. Each antenna element may be supplied with RF energy so that the element radiates a fixed beam of RF energy in its predetermined direction of orientation. The RF energy supplied to a first group of the antenna elements is modulated with a first subcarrier having a first frequency, and the RF energy supplied to a second group of the antenna elements is modulated with a second subcarrier having a second frequency. The first and second groups of antenna elements are arranged such that the elements alternate with one another so that the RF energy radiated by adjacent antenna elements is modulated by the first and second subcarriers of different frequencies. The first and second subcarriers are modulated with a variable signal which has a phase at each antenna element that corresponds to the direction of orientation of that antenna element.

In accordance with more specific aspects, the RF energy emitted by each antenna element may be further modulated with a reference signal which has a phase that is constant with angular direction and which is referenced to a predetermined direction, e.g., Magnetic North. The phases of the variable signals which modulate the subcarriers impressed upon the RF energy emitted by each antenna element are preferably adjusted relative to the phase of the reference signal to have values which correspond to the actual direction of orientation of each element, i.e., the azimuth bearing of each element. At angular orientations which coincide with the directions of orientation of the antenna elements and at the peaks of the main beams radiated by the elements, RF energy will be received from a single element and the direction will be given directly by the phase of the variable signal which modulates the RF energy radiated by that element. In all other orientations, however, RF energy will be received from two adjacent antenna elements and, upon demodulation, two variable signals having phases corresponding to the directions of orientations of their corresponding elements will be obtained. The relative amplitudes of the two variable signals will be a function of the angular orientation of the receiver, and the resultant signal obtained by forming the vector sum of the two variable signals will have a phase relative to the reference signals which corresponds to the direction of orientation of the receiver.

By frequency modulating different frequency subcarriers with the variable phase signals, multipath effects are minimized due to the capture effect inherent in FM demodulation. Moreover, since the invention employs spatially static antenna patterns which, either individually or in combination with at most one other pattern, provide complete bearing information, the invention is readily adaptable to uni-directional navigational systems.

Other more specific features and advantages of the invention will become apparent from the description which follows.

DESCRIPTION OF PREFERRED EMBODIMENTS

The present invention is particularly well adapted for use as a navigation system for aircraft and the like, and will be described in that context. It will be appreciated, however, that this is illustrative of only one utility of the invention, and that the invention is applicable to other types of vehicles as well as to other types of systems.

As used herein, the term "navigation" is used in a broad sense to refer to any type of system which is used for providing directional, positional or guidance information, including conventional navigational systems such as omni-directional range systems, localizer systems, glide angle systems, and instrument landing or ground controlled approach systems. Because the invention is particularly well adapted for use as an omni-directional system, it is convenient to describe the invention initially in the context of a VOR-type system, since VOR systems are widely known and understood. Also, since VOR systems are well known, it is convenient for describing the invention to use frequencies for the reference signal, variable signal, subcarriers, etc., which are similar to standard VOR frequencies. It will be appreciated, however, that the frequencies and other parameters of the system used in the description which follows are for illustrative purposes and that other frequencies and parameters may also be employed. Conventional VOR systems operate in the VHF range of 112-118 MHz. The invention may operate at such VHF frequencies also, although certain advantages, such as very narrow beamwidths which afford greater immunity to multipath, may be obtained by operating at microwave frequencies, e.g., at X-band. In addition, 30 Hz is conventionally used as the frequency of the reference phase and variable phase signals in VOR systems, and 9960 Hz is conventionally used in VOR systems as the frequency of a subcarrier. The invention may likewise use these frequencies. It will be appreciated, however, that these frequencies are only exemplary and that the invention may utilize any other convenient frequencies.

Figure 1:
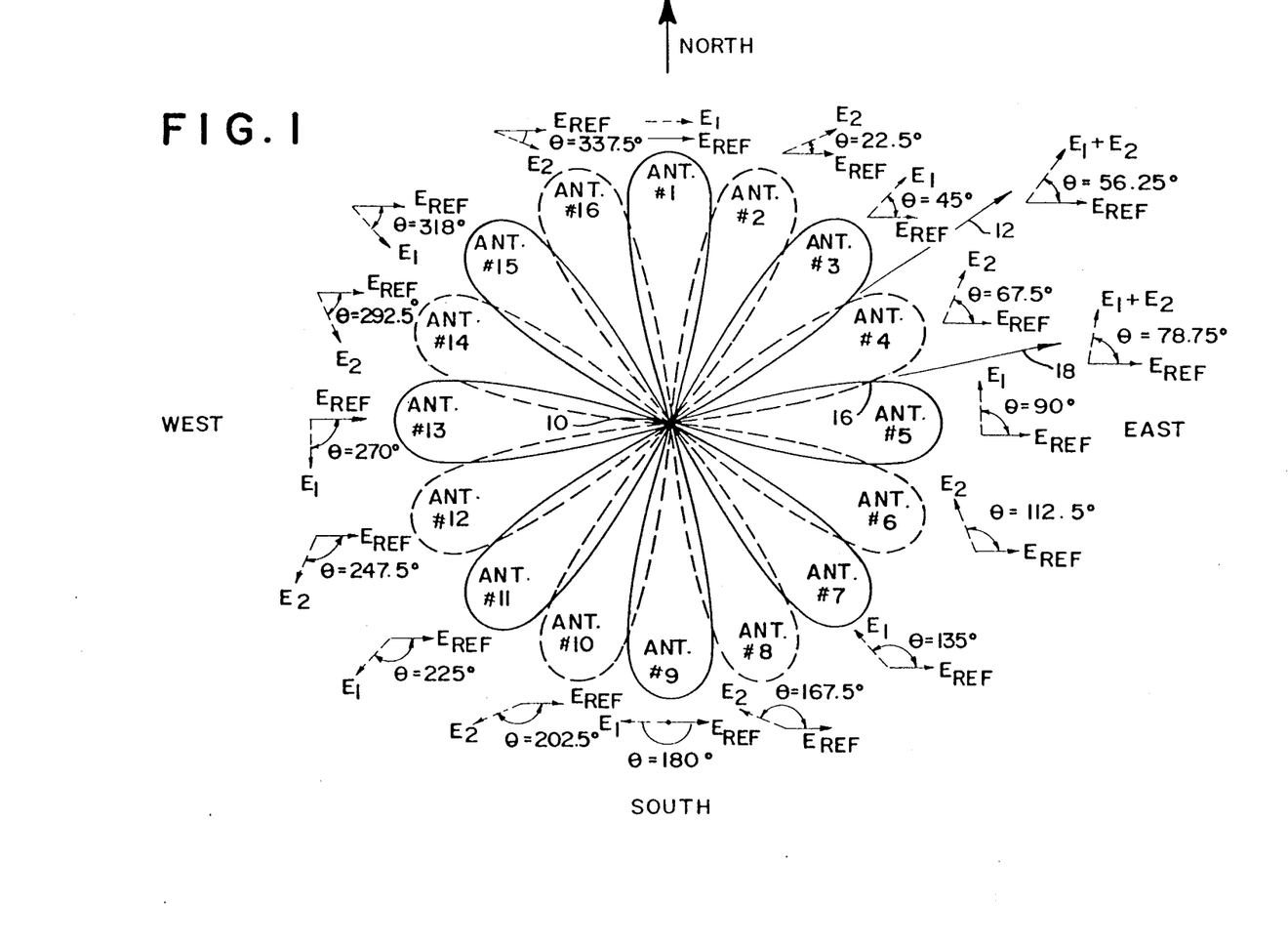
FIG. 1 is a diagrammatic view illustrating an antenna radiation pattern of the subcarrier signals for an omni-directional phase reference navigation system in accordance with the invention.
Figure 3:
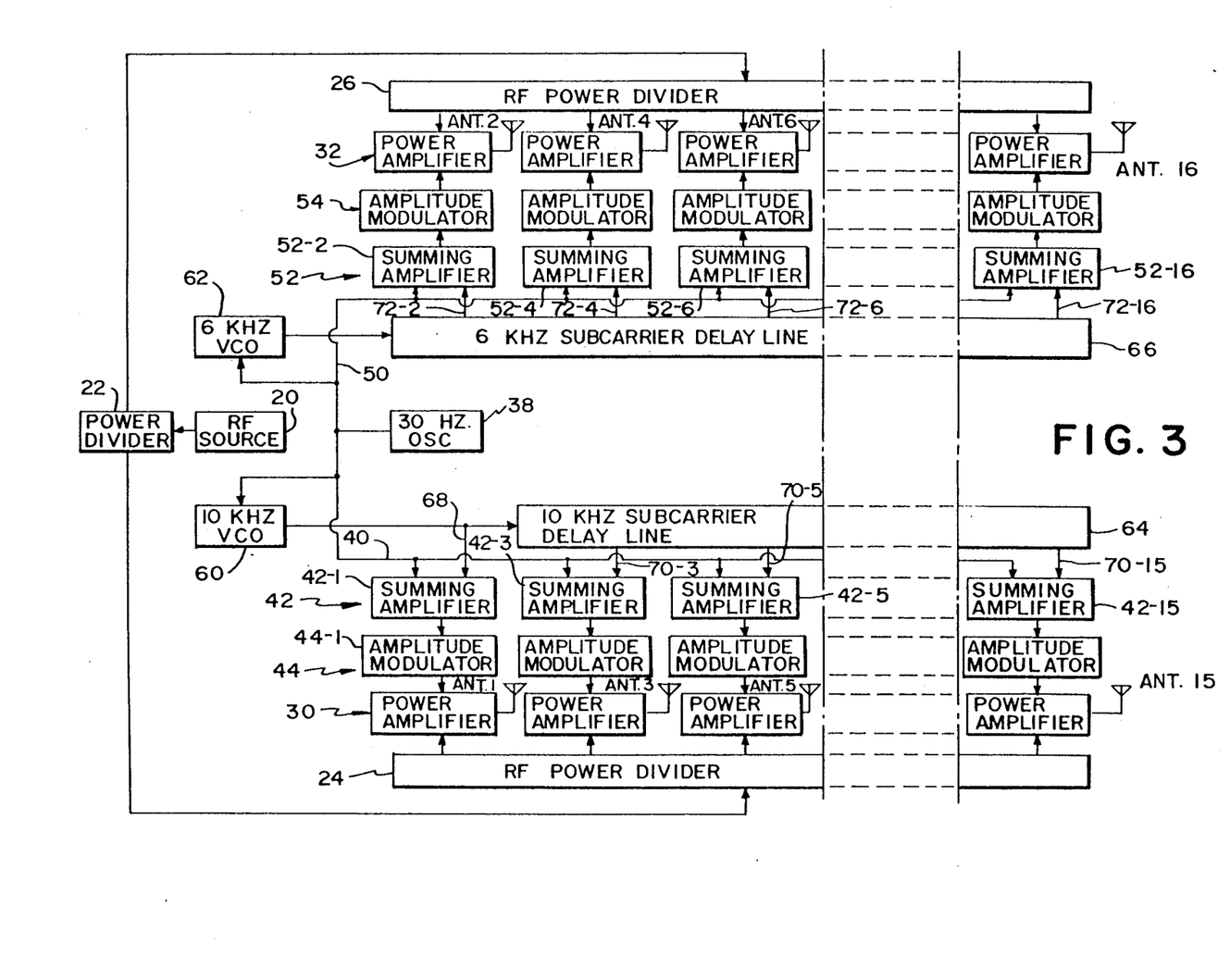
FIG. 3 is a block diagram of preferred form of a transmitter for producing the omni-directional radiation pattern of FIG. 1.

FIG. 1 illustrates diagrammatically the antenna radiation pattern of the subcarrier signals of an omni-directional navigational system in accordance with the invention, and FIG. 3 is a block diagram of a preferred form a transmitter of the system. As with a conventional omni-directional range system, the system of FIGS. 1 and 3 provides azimuth bearing information between the transmitter location and a cooperating remote receiver. It accomplishes this function, however, in a very different way from known phase reference omni-directional range systems. Broadly stated, the invention functions by generating a variable signal which has a phase that varies continuously as a function of azimuth bearing between the transmitter location and the receiver and which has a value relative to a reference signal that corresponds to the azimuth bearing relative to a predetermined direction, e.g., Magnetic North. In a conventional omni-directional range system, such as a VOR, the variable phase signal is generated by a spatially rotating electromagnetic field produced by mechanically or electrically rotating an antenna radiation pattern of a predetermined shape. In contrast, the invention produces the variable phase signal using a spatially static non-rotating field.

As shown in FIG. 1, the invention may employ sixteen discrete narrow antenna beams (Ant. #1-Ant. #16) radiating outwardly from a transmitting location 10 and arranged to cover 360° in azimuth. Each antenna beam may be produced by a corresponding antenna element (see FIG. 3) of a fixed antenna array, each of the antenna elements being oriented so that its beam points in a predetermined direction (Θ) and so that the beams are equi-angularly spaced about 360°, as shown in FIG. 1. With sixteen antenna elements, equi-angularly spacing the beams corresponds to a 22.5° angular spacing between adjacent antenna beams. Each beam preferably has a 3dB beamwidth of 22.5°. This causes adjacent antenna beams to intersect and crossover at their half-power points, and places a null at the peak of an adjacent antenna beam, as shown. For clarity, the odd-numbered antenna beams are shown in FIG. 1 in solid lines and the even-numbered beams are shown in dotted lines. Also, the figure omits antenna sidelobes and shows only the main beam of each antenna. One of the antennas, antenna 1, for example, may be oriented such that its beam is pointed in a predetermined reference direction such as North, as shown in FIG. 1. This points antenna beam 5 East (90°), antenna beam 9 South (180°), and antenna beam 13 West (270°).

Each antenna may radiate an RF carrier which is modulated by a reference phase signal $E_{REF}$ and by a variable phase signal $E_1$ or $E_2$, $E_1$ being used to designate the variable phase signal of the odd-numbered antennas and $E_2$ being used for the even-numbered antennas. The RF carriers are preferably of the same frequency and are derived from a common source, and are radiated in RF phase. The reference phase signal may amplitude modulate the RF carriers directly and have a phase which is constant with azimuth. Each variable phase signal may frequency modulate a subcarrier which in turn amplitude modulates the RF carrier and which has a phase relative to the reference signal that corresponds to the direction of orientation of the antenna. Preferably, the phase of the variable phase signal is adjusted such that each degree of phase difference between the variable and reference signals corresponds to a 1° change in azimuth. Accordingly, a phase difference of $2\pi$ radians between the signals would correspond to 360° in azimuth. Moreover, the phase of the variable phase signal which is radiated by each antenna is preferably adjusted such that the absolute magnitude of the phase relative to the reference signal corresponds to the azimuth of the peak of the beam of that antenna. Thus, the phase of the variable phase signal radiated by antenna 1 relative to the reference signal would be 0°, the phase radiated by antenna 2 would be 22.5°, the phase radiated by antenna 3 would be 45°, etc. A receiver which is located due East, for example, would be at the peak of antenna beam 5 and would receive a variable phase signal having a phase of 90° relative to the reference signal. Similarly, a receiver located due South would receive a signal from antenna 9 having a phase difference of 180° relative to the reference signal. A receiver located anywhere within an angular sector corresponding to the beam pattern of an antenna would receive the variable phase signal transmitted by that antenna, and the phase of the received signal relative to the reference signal would be constant. Thus, assuming a 22.5° beamwidth and an antenna radiation pattern as shown in FIG. 1, a variable phase signal having a phase of $\Theta = 67.5°$ would be received from antenna 4 any place within an angular sector between $\Theta = 45°$ (the peak of antenna 3 which corresponds to a null of antenna 4) and $\Theta = 90°$ (the peak of antenna 5 and the other null of antenna 4). Although the phase of the variable phase signal is constant throughout this 45° sector, the amplitude of the signal varies as a function of azimuth from a peak value at an azimuth of $\Theta = 67.5°$ corresponding to the peak of antenna beam 4 to zero at $\Theta = 45°$ and $\Theta = 90°$ corresponding to the first nulls of the antenna 4 pattern.

In a similar fashion, in a sector between $\Theta = 22.5°$ and $\Theta = 67.5°$, a variable phase signal having a phase of 45° relative to the reference signal would be received from antenna 3, and in a sector between 67.5° and 112.5°, a variable phase signal having a phase of 90° would be received from antenna 5. In each sector, the amplitude of the variable phase signal received from the corresponding antenna will vary as a function of azimuth in a manner similar to that described for antenna 4, but its phase will be constant.

As will be described in more detail in connection with FIG. 4, the invention combines the variable phase signals received from adjacent antennas to produce a resultant signal which has a phase relative to the reference which varies linearly as a function of azimuth. A receiver located at an azimuth bearing of $\Theta = 56.25°$ would be exactly midway between the peaks of antennas 3 and 4 along a radial 12 and at the half-power crossover point 14 of the two antenna patterns. Thus, the receiver would receive equal amplitudes of a 45° variable phase signal $E_1$ from antenna 3 and a 67.5° variable phase signal $E_2$ from antenna 4. Upon combining $E_1$ and $E_2$ vectorially, the resultant signal would have a phase of $\Theta = 56.25°$ relative to the reference signal, as shown by the vector diagram in FIG. 1. This corresponds to the azimuth of radial 12.

As the receiver is moved from the azimuth of radial 12 in a direction of decreasing azimuth angle (counterclockwise in FIG. 1) toward the peak of the antenna beam 3, the amplitude of the signal $E_1$ from antenna 3 will increase and the amplitude of the signal $E_2$ from antenna 4 will decrease toward zero until the peak of antenna beam 3 is reached at 45°. The phase of the resultant signal obtained by combining $E_1$ and $E_2$ within this angular range will vary directly with azimuth between 56.25° and 45° and provide a direct indication of azimuth bearing. Upon moving in a direction of increasing azimuth angle from radial 12 (clockwise in the figure), the amplitude of $E_2$ will increase and the amplitude of $E_1$ will decrease, and the phase of the resultant signal will increase with azimuth. $E_2$ will increase and $E_1$ will decrease until an azimuth of 67.5° corresponding to the peak of antenna 4 is reached. As the azimuth further increases beyond the peak of antenna 4, $E_2$ will decrease and a signal $E_1$ will no longer be received from antenna 3, since this is beyond the angular sector corresponding to the main beam of antenna 3. (Although a sidelobe signal may be received from another antenna, due to capture effect it will not affect the direct signal being received.) Instead, a new signal $E_1$ having a phase of 90° will be received from antenna 5, and the amplitude of this signal will increase with azimuth until the peak of antenna 5 is reached at an azimuth of 90°. At the half-power crossover point 16 of the patterns of antennas 4 and 5, equal amplitudes of $E_1$ and $E_2$ will be received, and the resultant signal will have a phase of 78.75°, as shown, corresponding to the azimuth of radial 18.

The phase angle diagrams in FIG. 1 adjacent to each antenna pattern show the phase angle relative to the reference signal of either the variable phase signal from that antenna alone ($E_1$, or $E_2$) or the resultant signal obtained by combining the signals from adjacent antennas. In order to enable the variable phase signals $E_1$ and $E_2$ to be combined, in the manner just described, to form a resultant signal which has a phase relative to the reference signal $E_{REF}$ that corresponds to azimuth, it is necessary that the variable phase signals $E_1$ and $E_2$, as well as the reference signal $E_{REF}$, all be at the same frequency and preferably be derived from a common source. By analogy to conventional VOR systems, these signals may have a frequency of 30 Hz.

In addition, in order to enable the receiver to separate and distinguish the variable phase signals from adjacent antennas, the signal for each antenna may be impressed onto a subcarrier which, in turn, modulates the RF carrier emitted by that antenna. Two different frequency subcarriers may be used, one for $E_1$ for the odd-numbered antennas and one for $E_2$ for the even-numbered antennas. The mean frequencies of the two subcarriers may be nominally 10 KHz and 6 KHz, and, as shown in FIG. 1, the frequencies may alternate between adjacent antennas. When the receiver is located at an azimuth other than one corresponding to the peak of one antenna beam and the nulls of the adjacent beams, the receiver will simultaneously receive two RF carriers of the same frequency, each modulated by a different frequency subcarrier conveying different variable phase information. The amplitudes of the two RF carriers will vary with azimuth, as will the amplitudes of the phase signals which the carriers convey.

Figure 2:
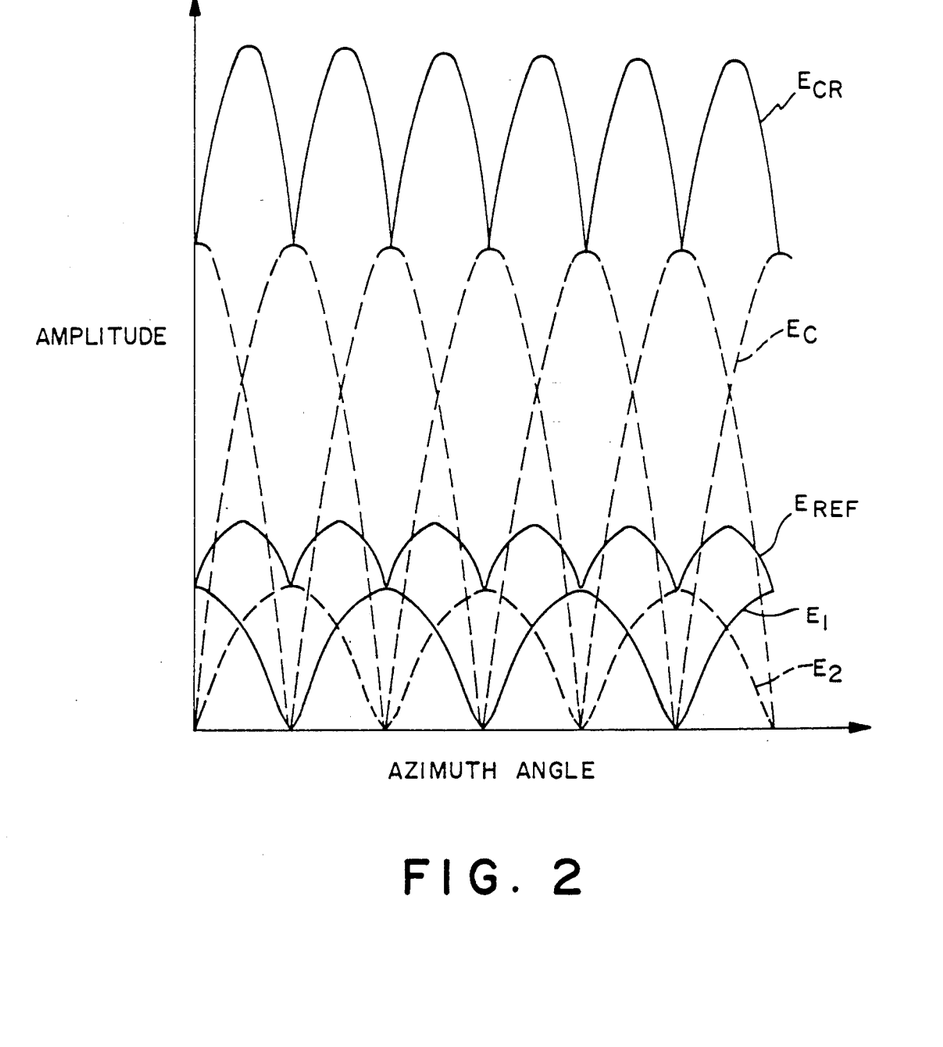
FIG. 2 is a diagrammatic view illustrating a rectangular plot of discrete antenna RF lobe structures and resultant radiation patterns.

Although FIG. 1 illustrates subcarrier radiation patterns comprising sixteen discrete beams produced by an array of sixteen discrete antenna elements arranged to provide omni-directional coverage, a greater or fewer number of antennas and beams may be used, depending upon the requirements of the system. The number of beams required is determined by the antenna beamwidth and the degrees of angular coverage desired. The smaller the beamwidth, the greater the number of beams required to cover a given angular sector. However, smaller beamwidths afford greater immunity to multipath signals because the subcarriers having the same nominal mean frequency of 10 KHz or 6 KHz will have a different instantaneous frequency for each beam. Preferably, the instantaneous frequency of the subcarrier modulating each beam is adjusted to be a function of sin $\Theta$, where $\Theta$ is the angular orientation of the beam relative to a reference direction, e.g., Magnetic North. The individual beams of the RF carrier signal Ec and the 30 Hz phase reference signal are radiated in RF phase, thus providing a resultant RF carrier signal $Ec_R$ and a resultant 30 Hz reference signal $E_{REF}$, as indicated in FIG. 2. The amplitudes of the detected subcarrier signals $E_1$ and $E_2$ will vary with azimuth, as shown. Many different types of antenna elements and antenna arrays can be used to radiate the narrow beams of RF energy and produce the desired antenna radiation pattern. The pattern may be produced, for example, by direct radiation from an array of horn or yagi antennas, or from an array of horn antennas which share a common aperture, or from a plurality of point source radiators which share a common aperture such as a Luneberg lens. The main requirement of the antenna beams is that they be radiated in RF phase and that adjacent beams crossover at either the half-power points or at a point where the null of one beam coincides with the peak of the adjacent beam. Although any convenient frequency may be used for the RF carrier, it is desirable that the frequency be in the microwave region, and preferably in the X-band region, since X-band frequencies have good weather penetration.

FIG. 3 is a block diagram showing an embodiment of a transmitter in accordance with the invention which may be used to produce the pattern shown in FIG. 1. As shown, the energy from an RF source 20 may be supplied to a first power divider 22, which divides the power into two equal parts and supplies the power to second and third RF power dividers 24 and 26. Each of the power dividers 24 and 26 divides its input power equally among eight different outputs. The eight outputs from the second RF power divider 24 may be supplied to corresponding power amplifiers 30, each of which has an output which drives a corresponding one of the odd-numbered antennas 1, 3, 5 . . . 15. Similarly, the eight outputs from the third RF power divider 26 are supplied to corresponding power amplifiers 32 which drive the even-numbered antennas 2, 4, 6, . . . 16. RF phase shifters (not illustrated) may be included for adjusting the phase of the RF energy radiated by each antenna to be in RF phase.

The transmitter may further include an oscillator 38 which produces a 30 Hz (or some other convenient frequency) signal that serves as the reference phase signal and which is also used for producing the variable phase signals. As shown, the output of oscillator 38 may be supplied via a line 40 to a first plurality of summing amplifiers 42, the outputs of which drive corresponding amplitude modulators 44 and corresponding power amplifiers 30. This causes the RF power radiated by each of the odd-number antennas to be amplitude modulated by the 30 Hz signal. The oscillator output is similarly supplied via line 50 to another plurality of summing amplifiers 52 which, in turn, drive corresponding amplitude modulators 54 and corresponding power amplifiers 32 to amplitude modulate the RF carrier radiated by the even-number antennas with the 30 Hz reference signal. The 30 Hz reference signal is applied in phase to each of the amplitude modulators 44 and 54, and each antenna outputs an in-phase 30 Hz reference signal as an amplitude modulation on its emitted RF carrier.

The output from the 30 Hz oscillator 38 is also supplied to a first subcarrier oscillator 60 and to a second subcarrier oscillator 62, as shown. Subcarrier oscillators 60 and 62 may be similar voltage control oscillators (VCO's), with oscillator 60 having a nominal mean frequency of 10 KHz and oscillator 62 having a nominal mean frequency of 6 KHz. The output from oscillator 38 frequency modulates (FM) each VCO at a 30 Hz rate. Preferably, each VCO is arranged such that the 30 Hz signal causes the VCO output frequency to deviate ±δf (±480 Hz for example).

The 30 Hz FM modulated subcarriers from VCO's 60 and 62 comprise the sources of the variable phase signals which modulate the RF carriers emitted by the antennas. The phase of the 30 Hz FM modulation on each subcarrier relative to the phase of the 30 Hz AM modulation of the reference signal is adjusted so that the phase of the 30 Hz FM signal at each antenna corresponds to the direction of the orientation of the antenna, i.e., its azimuth bearing. VCO 60 may supply the variable phase signals for the odd-numbered antennas, as shown, and VCO 62 may supply the variable phase signals for the even-numbered antennas. The variable phase signal for each antenna may be obtained by time delaying the output of the VCO which is supplied to the antenna by an amount corresponding to the required phase difference. This may be accomplished by using first and second subcarrier delay lines 64 and 66 which temporally delay the VCO signal supplied to the summing amplifiers associated with the antennas. With the exception of summing amplifier 42-1, which is associated with antenna 1 and which receives an output directly from VCO 60 via line 68, delay line 64 may provide output taps 70-3, 70-5, ... 70-15 to summing amplifiers 42-3, 42-5, ... 42-15, respectively, which are associated with antennas 3, 5, ... 15. Similarly, the delay line 66 may provide output taps 72-2, 72-4, 72-6, ... 72-16 to summing amplifiers 52-2, 52-4, 52-6, ... 52-16, respectively, associated with antennas 2, 4, 6, ... 16. Delays lines 64 and 66 may comprise integrated circuit serial analog delay lines (SAD's) or conventional L-C delay lines.

As shown in FIG. 1, antenna 1 may be pointed (Magnetic) North, which may be taken as the reference direction. Preferably, the phase of the variable signal from antenna 1 relative to the reference signal is 0°, corresponding to the actual azimuth of Magnetic North. Accordingly, as shown in FIG. 3, the output of VCO 60 may be fed directly to summing amplifier 42-1, via line 68, along with the reference signal from oscillator 38 on line 40. The summing amplifier sums the two signals and applies the combined signals to amplitude modulator 44-1, which amplitude modulates the RF carrier emitted by antenna 1. Since antenna 3 is oriented at an azimuth of 45°, delay line 64 preferably delays the 30 Hz FM output of VCO 60 by an amount corresponding to a 45° phase difference between the reference 30 Hz and the 30 Hz modulation of the 10 KHz subcarrier of VCO 60. The delayed subcarrier is output on a tap 70-3 to summing amplifier 42-3, where it is combined with the reference signal on line 40 to amplitude modulate the RF carrier emitted by antenna 3. Thus, the RF carrier from antenna 3 is amplitude modulated both by the 30 Hz reference signal and by the 10 KHz subcarrier from VCO 60, which is FM modulated with a 30 Hz variable phase signal which differs in phase from the reference signal by 45°.

At 30 Hz, a 45° phase difference corresponds to a time delay of the order of 4.166 msec, which is the time delay provided by delay line 64 to output a 70-3. Since the odd-numbered antennas in the illustrated embodiment are angularly spaced in azimuth at 45° increments, delay line 64 provides the same incremental time delay between adjacent taps corresponding to a 45° phase shift at 30 Hz. Thus, the cumulative phase shift between the delay line input and output tap 70-5 is 90°, corresponding to the azimuth of antenna 5.

In a similar manner, delay line 66 delays the 6 KHz subcarrier from VCO 62 by 45° increments between adjacent taps so that the 30 Hz reference signals applied to the even-numbered antennas differ in phase from one another by 45°. The first tap 72-2 of the delay line, however, imposes a delay of 22.5° which corresponds to the azimuth of antenna 2. This places the beam from antenna 2 midway between the beams from antennas 1 and 3 located at 0° and 45°, respectively, and thereafter locates the even-numbered beams at 45° angular increments so that they are midway between adjacent odd-numbered beams.

Figure 4:
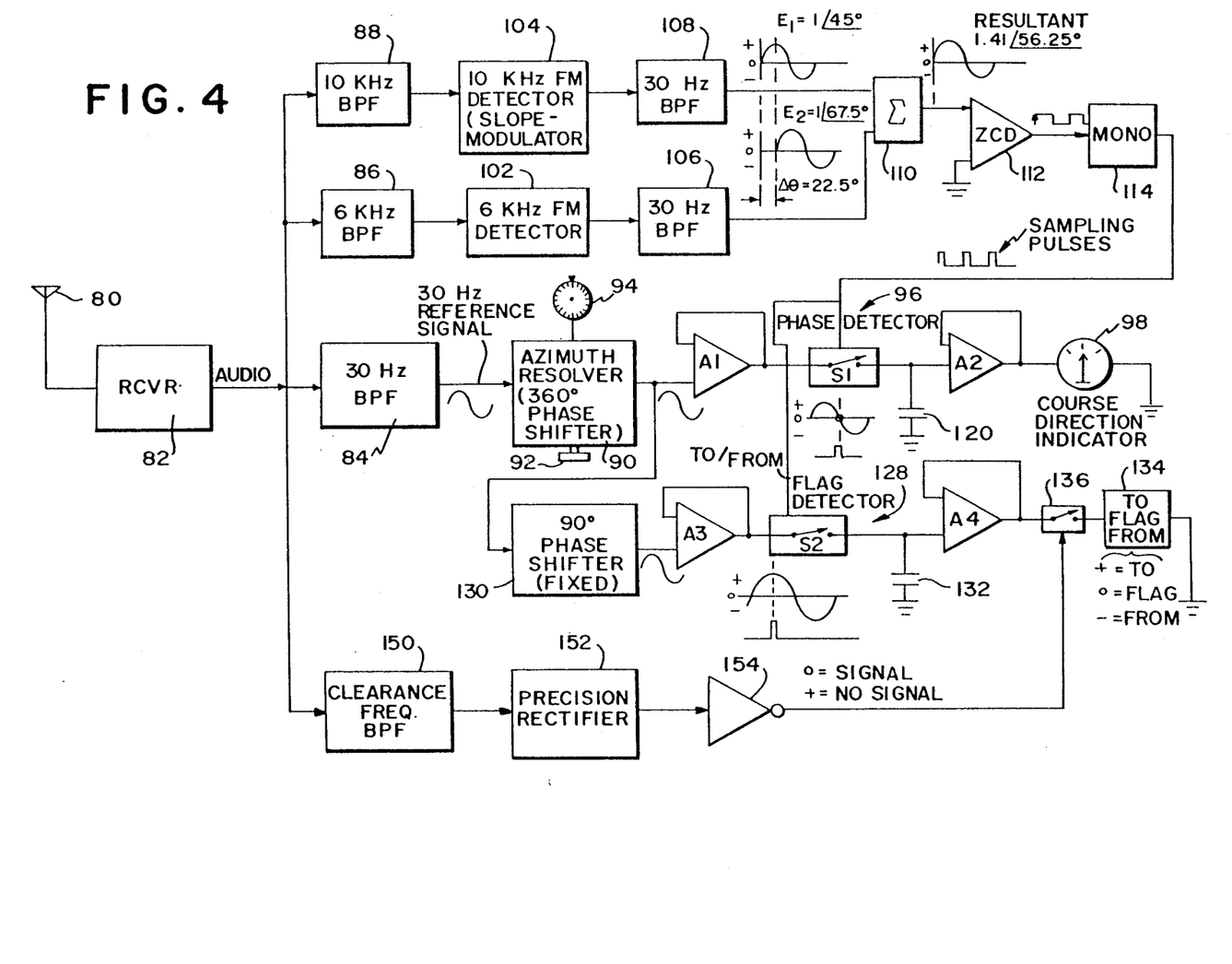
FIG. 4 is a block diagram of a receiver/processor for the navigation system in accordance with the invention.

FIG. 4 is a block diagram of a preferred form of a receiver/processor of the invention which is adapted to receive and process navigation signals emitted by a system such as shown in FIGS. 1 and 3. As shown in FIG. 4, the receiver/processor includes a RF antenna 80 and an RF receiver 82 for receiving the RF carrier signals emitted by adjacent transmitter antennas. The receiver may include an AM detector (not illustrated) for demodulating the RF carrier and for providing a composite audio output signal. The audio output signal includes the 30 Hz reference phase signal and the 6 KHz and 10 KHz FM subcarriers which modulate the RF carriers radiated by adjacent transmitter antennas. The audio in the receiver may also include a clearance frequency, which will be described in detail in connection with the embodiment of FIG. 5, and may also include a voice and/or code identification of the navigation station, as is well known in conventional VOR systems.

The composite audio signal from receiver 82 may be supplied in parallel to a 30 Hz bandpass filter (BPF) 84, to a 6 KHz bandpass filter 86, and to a 10 KHz bandpass filter 88. The bandpass filters separate the reference phase signal and the two subcarrier components of the composite audio signal. The 30 Hz reference signal from filter 84 may be supplied to an azimuth resolver 90, such as that conventionally used with VOR systems. The azimuth resolver may comprise a variable phase shifter which imparts a phase shift to the reference signal between 0° and 360° corresponding to a desired azimuth bearing to the transmitter. Azimuth may be selected using an omni-bearing selector knob 92 and indicated on a indicator dial 94. The phase shifted reference signal from the azimuth resolver may be supplied to a phase detector 96, the output of which drives a course direction indicator 98, as will be described in detail shortly.

The 6 KHz and 10 KHz subcarriers from bandpass filters 86 and 88 may be supplied directly to corresponding FM slope-modulator detectors 102 and 104, respectively, as shown in FIG. 4. The FM detectors demodulate the 30 Hz modulation on the two subcarriers and provide corresponding 30 Hz output signals to respective 30 Hz bandpass filters 106 and 108, each signal having a phase corresponding to the azimuth of its respective antenna, and the signals having a phase difference corresponding to the phase difference between the adjacent antennas, e.g., 22.5° in the system of FIG. 1. The amplitude, however, of the signal from each FM detector will be proportional to the amplitude of the corresponding subcarrier, which will be proportional to the received RF carrier which was modulated by the subcarrier. The output signals from the 30 Hz bandpass filters 106 and 108 may be combined vectorially to produce a resultant 30 Hz signal by summing the signals in a summing amplifier 110. The resultant signal from the summing amplifier will be the vector sum of the two filtered 30 Hz input signals from the FM detectors. The frequency of the resultant signal will be 30 Hz also. However, the resultant signal will have a phase which is between the phases of the two input signals from the FM detectors and which will be determined by the relative amplitudes of the two input signals.

As indicated in FIG. 4, assuming that the filtered output signal from FM detector 104 has an amplitude of 1.0 and a phase of 45° and that the filtered output signal from FM detector 102 has an amplitude of 1.0 and a phase of 67.5°, as would be the case where the receiver is located on radial 12 at an azimuth midway between antennas 3 and 4 in FIG. 1, the resultant signal will have an amplitude of 1.41 and a phase of 56.25°. This value of phase corresponds to the azimuth of radial 12.

The resultant signal from the summing amplifier 110 may be applied to a zero-crossing detector 112 which may output a square wave signal to a monostable multivibrator 114, or the like. The multivibrator may output a pulse for each positive-going transition of the input square wave. These output pulses from the multivibrator may be used as sampling pulses in phase detector 96, which compares the phase of the resultant signal to the phase of reference signal from the azimuth resolver 90.

As shown in FIG. 4, phase detector 96 may comprise a first amplifier A1 which receives the reference signal from the azimuth resolver 90 and provides an output to a switch S1 which may be driven by the sampling pulses from the multivibrator 114. The output of the switch S1 may be connected to one input of a grounded capacitor 120 and to the input of a second amplifier A2. The output of amplifier A2 may drive the course direction indicator 98. Switch S1 may be a normally opened switch which is closed momentarily by each sampling pulse from multivibrator 114 to sample the value of the reference signal from amplifier A1. The sample values are stored as a voltage by capacitor 120, and the voltage on the capacitor is output by amplifier A2 to the course direction indicator.

When the resultant signal and the reference signal are in phase, the positive transitions of the square wave signal from the zero-crossing detector will occur at the same time as the zero-crossings of the reference signal and the reference signal will be sampled at a zero-crossing, as indicated at FIG. 4. The output of switch S1 thus will be zero volts. The voltage charge on capacitor 120 and the output of amplifier A2 will likewise be zero volts. When the resultant signal and the reference signal differ in phase, the reference signal will be sampled at other than a zero-crossing, and capacitor 120 will be charged either to a positive voltage or to a negative voltage depending upon the phase difference. The output voltage from amplifier A2 will likewise be either positive or negative, and this voltage may be used to drive the course direction indicator 98 to indicate the direction of the desired azimuth selected by the omnibearing selector knob 92 of the azimuth resolver.

In conventional omni-directional navigational systems, a 180° ambiguity exists, which may be resolved by a TO/FROM flag detector 128. As shown in FIG. 4, the flag detector may be implemented by applying the reference signal from the azimuth resolver to a fixed 90° phase shifter 130, the output of which may be supplied to a phase detector similar to phase detector 96 comprising an amplifier A3, a switch S2, a capacitor 132 and an amplifier A4. Switch S2 samples the phase shifted reference signal from phase shifter 130 which is output from amplifier A3. The switch may be driven by the same sampling pulses from multivibrator 114 which drive switch S1. As indicated in FIG. 4, when the reference signal and the resultant signal are in phase so that the reference signal is being sampled at a zero crossing by switch S1, the reference signal from amplifier A3, which has been shifted 90°, will be sampled at a positive peak. Accordingly, the capacitor 132 will be charged to a positive voltage and the output from amplifier A4 will be positive. This voltage may be supplied to a dual polarity indicator 134. When the voltage to indicator 134 is positive, the indicator may display "TO" to indicate that the bearing is toward the transmitter. On the other hand, if the reference voltage from amplifier A3 is sampled during a negative portion of its cycle, the output from amplifier A4 will be negative and indicator 134 may display "FROM", to indicate that the bearings is away from the transmitter. If either or both the reference and variable signals are not received or if certain processor components become open-circuited, the voltage to indicator 134 will be zero and the indicator will display "FLAG" to indicate no signal or a system failure (alarm condition). This is also the case as where a switch 136 located between the output of amplifier A4 and the input to the indicator is opened, the indicator may display "FLAG" as an alarm indication.

Figure 5:
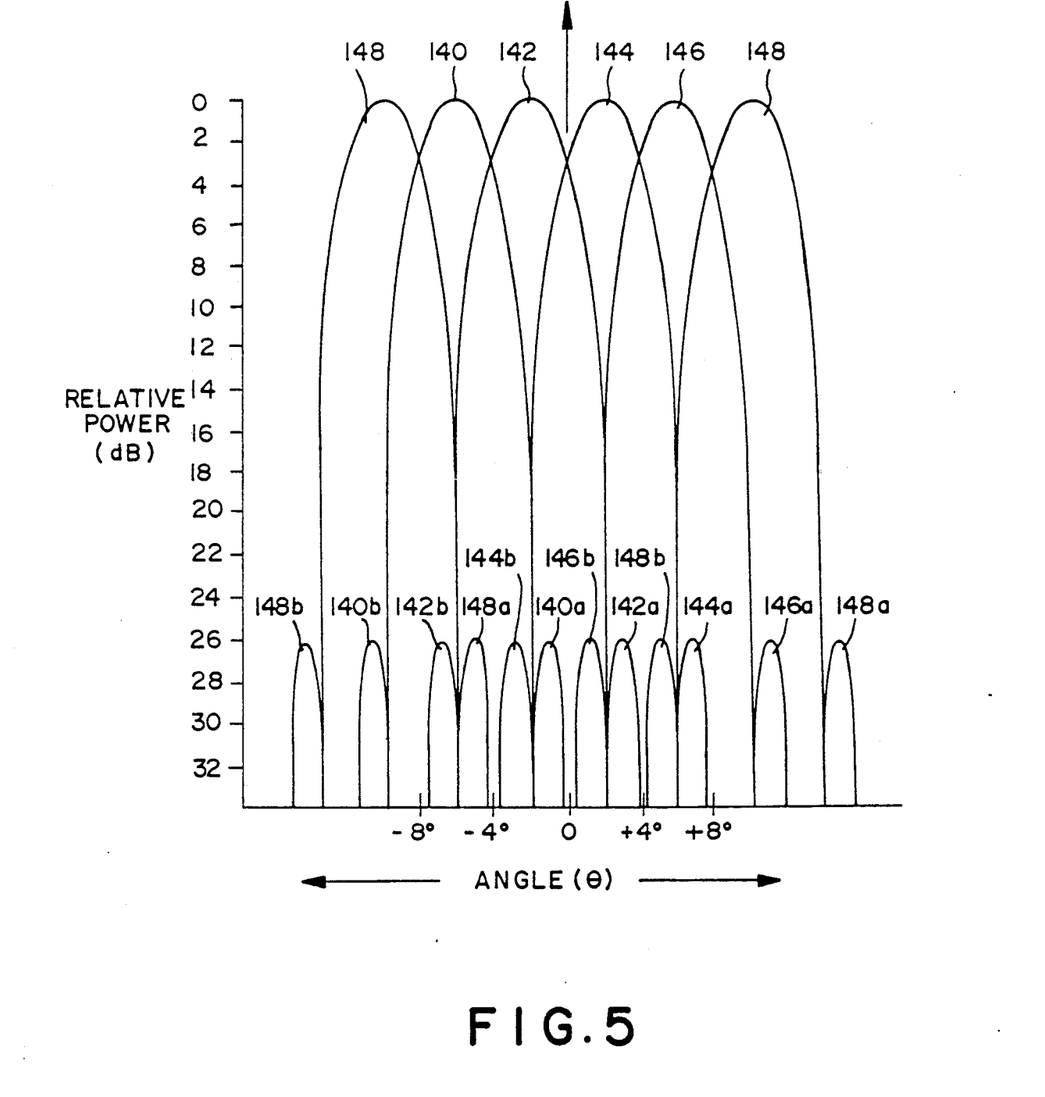
FIG. 5 is a diagrammatic view of an antenna subcarrier radiation pattern of another form of the invention.

When the system is used as a uni-directional or bi-directional navigation system, two additional RF beams may be used to provide flag alarm signals at the outer edges of the angular sector of coverage. This is illustrated in FIG. 5 which shows the antenna radiation pattern of a uni-directional systems which employs four RF beams 140, 142, 144 and 146 for navigation, and two beams 148 to provide the flag alarm signals. The first sidelobes of each beam are shown in the figure. The sidelobes associated with each main RF beam are correspondingly numbered and designated "a" or "b". Beams 148 may be modulated with an audio tone, such as 1300 Hz, which is designated as a clearance frequency and which the receiver of FIG. 4 detects and processes. The RF carrier frequency of beam 148 is the same as the RF frequency of the navigation beams 140-146. When an aircraft receives one of beams 148, the audio output of receiver 82 includes a component corresponding to the clearance frequency which may be processed to provide the FLAG display on indicator 134, as will be described.

As in the omni-directional system described above, one of two different frequencies subcarriers, e.g., 10 KHz and 6 KHz, may be used to modulate the beams 140-146, with the modulation applied to each beam alternating between the different frequencies subcarriers. Thus, beams 140 and 144 may be modulated with a 10 KHz subcarrier and beams 142 and 146 may be modulated with a 6 KHz subcarrier. As with the omni-directional system, the phase of the variable phase signal that frequency modulates the subcarrier applied to each beam may be adjusted relative to the reference phase to correspond to a predetermined angular orientation. As shown in FIG. 5, all of the beams may have beamwidth of 4°. The half-power crossing point of beams 142 and 144 may be used to indicate a reference angle of $\Theta=0°$. The phase of the subcarrier modulation applied to beams 140-146 may be adjusted for a 4° difference between adjacent beams. In addition, the phase of the variable signal of each beam may be selected to correspond to the actual angular orientation, e.g., azimuth, of the beam.

The flag alarm signals provided by beams 148 are used to resolve an ambiguity. Without the clearance frequency modulation on beams 148, an aircraft to the side of the antenna pattern of FIG. 5 (at an angular orientation greater than + or −6°) would receive a signal from beam 140 or its sidelobe 140a or from beam 146 or its sidelobe 146a to the exclusion of the other navigational beams without regard to bearing, which would incorrectly indicate that the aircraft bearing coincided with the peak of the beam. Anytime the receiver is positioned more than + or −6° from the reference orientation for the uni-directional system of FIG. 5, energy will be received from one of beams 148, and the clearance frequency will be present as a component of the audio output of receiver 82. The presence of this frequency can be detected by supplying the audio output to a clearance frequency bandpass filter 150, the output of which may be connected to a precision rectifier 152, which supplies a rectified output to a DC voltage polarity inverter 154. The output of inverter 154 may be used to control switch 136. Inverter 154 may be arranged so that its output is positive when the clearance frequency is not present (to close switch 136) and zero when the clearance frequency is present (to open switch 136).

The uni-directional system of FIG. 5 may be used, for example, as a localizer to indicate the correct azimuth approach to a runway. If the antenna array which produces the pattern of FIG. 5 is oriented such that the pattern extends in a vertical direction and the angle $\Theta$ represents the elevation, it may be used as a glide angle indicator to the runway.

As will be appreciated from the foregoing, a significant advantage of the invention is that it does not employ spatial modulation produced by a rotating field or antenna pattern, as do conventional navigational systems such as VOR. The invention employs a static non-rotating pattern, and it is unnecessary for the receiver to receive radiation from all antennas of the antenna array in order to derive navigational information. In fact, the uni-directional system of FIG. 5 illustrates very well the fact that a small number of narrow beam, uni-directional antennas can be used to provide coverage of a small angular sector. The advantage of being able to function with a small number of narrow beams means that an omni-directional system may be implemented by installing the antennas about the periphery of a tower or a building where the field of view of some antennas is blocked.

Another highly advantageous feature of the invention is that it is substantially immune to multipath effects or to sidelobe radiation from the antennas. This results from the use of different frequency subcarriers on adjacent antennas and FM modulation to provide navigational information, and the capture effect provided by FM demodulation of the navigational information on the subcarriers. As previously described, the instantaneous frequency ($f_i$) of the subcarriers varies as a function of angular orientation according to the equation $f_i = f_s + \delta f \sin \Theta$, where $f_i$ is the instantaneous frequency, $f_s$ is the mean subcarrier frequency, $\delta f$ is the frequency deviation, e.g., 480 Hz, and $\Theta$ is the angular orientation. Thus, for a 4° beamwidth system, such as shown in FIG. 5, the instantaneous frequency difference ($f_d$) between the 10 KHz subcarriers of adjacent beams 8° apart would be approximately 66.3 Hz. It is well known that the addition of two sinewaves of slightly different frequencies ($f_d$) in a linear impedance produces maximum and minimum points. The time between maximum points is $1/f_d$. Therefore, the rate of frequency flutter is the difference in frequencies (fd). The deviation of the flutter $$\delta f_i \text{ is } f_d \left[ \frac{K}{1 \pm K} \right].$$

where K the amplitude ratio of the direct to reflected signals. In other words, the error voltage in the output of a slope detector will be proportional to the difference in frequency of the direct and interfering (reflected) signals and will depend very little on the amplitude of the interfering signal as long as it is smaller than the desired signal. Theoretically, no course error should be caused by an interfering (reflected) signal with K = 0.5. Accordingly, when processing the 10 KHz subcarrier from the main beam of an antenna, the 10 KHz information from the next 10 KHz modulated beam which enters a receiver due to the receiver receiving sidelobe radiation or via multipath would differ in frequency from the main beam and would be suppressed by the FM demodulator and 30 Hz filter in the receiver due to capture effect. Thus, the adjacent 10 KHz signal would not effect the phase relationship between the reference signal and the variable signal received from the main beam. The same situation applies with respect to the 6 KHz subcarrier.

In the case of the 30 Hz phase reference signal which amplitude modulates the RF carrier with a phase which is constant with angle, multipath signals or sidelobe radiation from the antennas can cause space modulation of the amplitude of the 30 Hz reference signal. However, since the reference information is conveyed by phase and not be amplitude, amplitude variations of the reference signal will not effect system performance. Considering a direct and reflected 30 Hz reference signal, a path difference of approximately 17 miles would produce only a 1° difference between the direct and reflected 30 Hz reference signal as received by an aircraft receiver. The resultant 30 Hz reference signal would be displayed even less than 1° from its normal value because the amplitude of the interfering reflected signal would lie small compared to the direct signals.

While preferred embodiments of the invention have been shown and described, it will be appreciated by those skilled in the art that changes may be made in these embodiments without departing from the principles and the spirit of the invention, the scope of which is defined in the appended claims.

I claim:

1. A navigation system comprising antenna means having n elements for radiating a plurality of fixed beams of RF energy in respective different predetermined angular directions; means for supplying RF energy to said antenna means to cause RF radiation therefrom; means for impressing upon each radiated beam a variable signal having a phase corresponding to the predetermined angular direction of the beam; and means for combining at a receiver the variable signals of first and second ones of the beams to form a resultant signal having a phase which varies as a function of angle between phases corresponding to the predetermined angular directions of the first and second beams and wherein said impressing means comprises means for generating first and second subcarriers of different frequencies; first means for modulating the first and second RF beams with the first and second subcarriers, respectively; and second means for modulating each subcarrier with the variable signal and wherein the first modulating means comprises means for modulating the RF energy radiated by each beam with a reference signal which has a phase that is constant with angular direction, and means for delaying the subcarriers which are supplied to at least n-1 of said elements so that the variable signal on each subcarrier has a phase relative to the reference signal that corresponds to the angular direction of the beam radiated by that element.

2. The system of claim 1, wherein said first means for modulating amplitude modulates the first and second RF beams with the first and second subcarriers, respectively, and said second means for modulating frequency modulates each subcarrier with the variable signal.

3. The system of claim 2, wherein the generating means comprises first and second variable frequency oscillators for generating the first and second subcarriers; and the second modulating means comprises means for shifting the frequency of the variable oscillators at the frequency of the variable signal; and further comprising means for supplying the shifted frequencies from the variable frequency oscillators to said elements for the RF beams.

4. The system of claim 3, wherein the delaying means comprises a delay line for delaying the frequency modulated subcarrier supplied to each element.

5. The system of claim 1, wherein said combining means comprises means for forming the vector sum of the variable signals so that the resultant signal has a phase which varies as a function of the amplitudes of the first and second subcarriers.

6. The system of claim 1, wherein the antenna means comprises an antenna array having a plurality of antenna elements, one for each beam of RF energy, each antenna element having a narrow beamwidth radiation pattern, the elements being arranged such that the radiation patterns of adjacent elements cross over one another at a predetermined power level, and such that the radiation patterns of the plurality of elements cover a predetermined angular sector.

7. A navigation system comprising a plurality of antenna elements, there being n antenna elements, each element having a radiation pattern with a predetermined beamwidth and the elements being arranged to have different beamwidth directions of orientation with the patterns of adjacent elements overlapping; means for supplying RF energy to the antenna elements so that each element radiates a fixed beam of RF energy in its predetermined direction of orientation; first means for modulating the RF energy supplied to a first group of antenna elements with a first subcarrier of a first frequency, and for modulating the RF energy supplied to a second group of antenna elements with a second subcarrier of a second frequency, the first and second groups of antenna elements alternating with one another such that the RF energy radiated by adjacent antenna elements is modulated by said first and second subcarriers of different frequencies; and second means for modulating the first and second subcarriers with a variable signal, and further comprising means to impress a reference signal upon the RF energy supplied to each antenna element, which reference signal has the same phase at each antenna element, and wherein the phase of the variable signal at each antenna element relative to the reference signal is adjusted to have a value corresponding to the angular orientation of the element relative to a reference direction.

8. The system of claim 7, wherein said reference direction is North, and the phase of the variable signal at each antenna element corresponds to the azimuth bearing of the antenna element.

9. The system of claim 7, wherein the supplying means comprises means for dividing RF energy from a common source equally among the antenna elements so that each antenna element radiates the same amount of RF energy, and wherein the antenna elements are arranged such that the radiation patterns of adjacent elements cross over one another at substantially a half-power point and such that the peak of each radiation pattern is located at substantially a null of the radiation patterns of adjacent elements.

10. The system of claim 7, further comprising means for receiving the RF energy radiated by first and second adjacent antenna elements and for demodulating the first and second subcarriers to recover the variable signals; means for combining the variable signals to produce a resultant signal having a phase which varies continuously as a function of angle from the predetermined direction of orientation of the first one of said adjacent antenna elements to the predetermined direction of orientation of the second one of said adjacent antenna elements; and means for comparing the phase of the resultant signal with the phase of a reference signal to determine the direction of orientation of the receiving means.

11. The system of claim 10, wherein the first and second subcarriers are frequency modulated by the variable signals, and the demodulating means comprises filter means for separating the first and second subcarriers, and first and second frequency demodulators for demodulating the subcarriers to recover the variable signals.

12. The system of claim 11, wherein the combining means comprises means for forming a vector sum of the variable signals to produce the resultant signal, and wherein said comparing means comprises a phase comparator for comparing the phases of the resultant signal and the reference signal to determine the bearing of the receiving means relative to the antenna elements.

13. The system of claim 7, wherein the system is arranged to cover a predetermined angular sector, and wherein the system comprises third means for modulating the RF energy emitted by antenna elements at sides of said sector with a predetermined clearance frequency to provide a flag alarm signal at a receiver.

14. A navigation method comprising radiating a plurality of fixed beams of RF energy in different predetermined angular directions; impressing upon each beam, as it is radiated, a variable signal having a phase corresponding to the predetermined angular direction of such beam; and combining at a receiver the variable signals of first and second ones of the beams to form a resultant signal having a phase which varies as a function of angle between the predetermined angular directions of the first and second beams and further comprising generating first and second subcarriers of different frequencies; modulating the first and second subcarriers with first and second variable signals respectively; and modulating the first and second RF beams respectively with the first and second subcarriers, having the first and second variable signals thereon and further comprising modulating each of the RF beams with a reference signal having a phase which is constant with angular direction, and adjusting the phases of the variable signals such that the phase of each variable signal relative to the reference signal has a value corresponding to the angular direction of its associated beam.

15. The method of claim 14, wherein the first and second variable signals are identical in frequency and are frequency modulated onto the first and second subcarriers.

16. The method of claim 15, wherein the first and second subcarriers are generated by respective first and second variable frequency oscillators, and wherein the variable phase signals are impressed upon the RF beams by shifting the frequencies of the first and second oscillators using a common modulating signal and time delaying the outputs of the variable frequency oscillators by different amounts corresponding to the angular directions of the first and second beams.

17. The method of claim 16, wherein the plurality of fixed beams is arranged to cover 360°, and wherein the variable signals are adjust such that a phase difference of $2\pi$ relative to the reference signal corresponds to 360°.

* * * * *